United States Patent [19]

Brandstetter et al.

[11] Patent Number: 4,750,933
[45] Date of Patent: Jun. 14, 1988

[54] FLOOR POLISH EMULSIONS BASED ON ETHYLENE COPOLYMER

[75] Inventors: Franz Brandstetter, Neustadt; Walter Ziegler, Edingen-Neckarhausen; Wolfram Dietsche, Frankenthal; Stefan Weiss, Neckargemuend; Albert Hettche, Hessheim; Otto Kuehneweg, Bad Durkheim, all of Fed. Rep. of Germany

[73] Assignee: BASF Aktiengesellschaft, Rheinland-Pfalz, Fed. Rep. of Germany

[21] Appl. No.: 914,509

[22] Filed: Oct. 2, 1986

Related U.S. Application Data

[63] Continuation of Ser. No. 737,025, May 22, 1985, abandoned.

[30] Foreign Application Priority Data

May 30, 1984 [DE] Fed. Rep. of Germany ....... 3420168

[51] Int. Cl.$^4$ ................................................. C09G 1/08
[52] U.S. Cl. ....................................... 106/10; 524/501; 524/515; 524/522; 525/227; 525/240; 525/241
[58] Field of Search ................... 106/10; 524/501, 515, 524/522, 523; 525/227, 240, 241

[56] References Cited

U.S. PATENT DOCUMENTS 3,658,741  4/1972  Knutson et al. ..................... 524/559
4,417,035  11/1983  Oeder et al. ....................... 526/208

FOREIGN PATENT DOCUMENTS 929643  6/1963  United Kingdom .

*Primary Examiner*—Amelia Burgess Yarbrough
*Attorney, Agent, or Firm*—Oblon, Fisher, Spivak, McClelland & Maier

[57] ABSTRACT

An aqueous wax dispersion for floor care contains a mixture of an aqueous secondary dispersion of an ethylene copolymer wax, having a specific MFI, and an aqueous primary dispersion together with plasticizers, leveling agents and water, and an ethylene copolymer wax in the form of an aqueous secondary dispersion is used for floor emulsions.

1 Claim, No Drawings

FLOOR POLISH EMULSIONS BASED ON ETHYLENE COPOLYMER

This application is a continuation of application Ser. No. 737,025, filed May 22, 1985, now abandoned.

The present invention relates to an aqueous wax dispersion for floor care which contains a mixture of an aqueous secondary dispersion of an ethylene copolymer wax, which has a specific melt flow index, and an aqueous primary dispersion, in addition to plasticizers, leveling agents and water, and to the use of an ethylene copolymer wax in the form of an aqueous secondary dispersion for floor emulsions.

Ethylene copolymers containing unsaturated carboxylic acids, such as acrylic acid, methacrylic acid, crotonic acid, maleic acid, etc., and their use as emulsifiable waxes are known in principle.

British Patent No. 929,643 describes the preparation of such waxes by polymerization at from 20° to 250° C. under from 100 to 2,000 bar in the presence of a free radical initiator and an organic solvent by a batchwise procedure. German Published Application DAS No. 1,720,232 discloses a continuous preparation process in which the polymerization is carried out in the presence of a free radical initiator at from 100° to 300° C. and under from 250 to 600 bar. In both cases, the waxes obtained have a melt viscosity at 140° C. of 100–1,200 mPa.s, ie. relatively low molecular weights. As a rule, these waxes possess adequate emulsification properties. Their acid numbers are, in particular, from 45 to 80. In particular, the ethylene/(meth)acrylic acid waxes are less suitable for floor care because of their melt viscosities, ie. owing to the relatively low molecular weight, their characteristics in the practical walk-on test being unsatisfactory. We have found that the relatively low molecular weight ethylene/acrylic acid copolymers having a relatively high acid number exhibit excessive tack in the walk-on test and therefore have a very poor dirt-repellent action on floor coverings subjected to frequent use.

In practice, therefore, emulsifiable synthetic waxes having fairly high molecular weights, as described in, for example, German Patent Nos. 1,180,131 and 1,237,783 and French Patent No. 1,343,962 as melt oxidation products of polyethylene, are preferably used for floor polishes. These waxes, which exhibit equally good emulsifying properties and have acid numbers of only about 15-20, show better behavior in the walk-on test. German Laid-Open Application DOS No. 3,044,519 states that the acid number of the wax used should be chosen so that it is just sufficient for emulsification and hence for advantageous processing, but no higher, since an increase in the acid number is accompanied by an increase in the hydrophilicity and hence a decrease in the water-repellent action. This conclusion is reached when it is considered that the polyethylene oxidation products, which as a rule are very suitable for the floor polish sector, are distinguished by a low acid number and a high molecular weight. Acid numbers of less than 40 have proven particularly useful, since a higher acid number results in a polish emulsion which has increased hydrophilicity and poorer dirt-repellent properties.

It should be pointed out that, when used for the formation of films for floor care, waxes should give coatings which are not only hard but also tough, scratch-resistant and non-adhesive. In practice, it is often necessary to compromise between the four properties to arrive at an optimum.

It is an object of the present invention to provide wax-like copolymers which, in addition to being colorless and odorless, give a tough, scratch-resistant non-tacky film having good dirt-repellent properties. Another precondition comprises good emulsifying characteristics, so that a very small amount of additional emulsifiers and of alkali is required.

We have found that this object is achieved by special ethylene copolymers.

The present invention relates to a wax dispersion for floor polishes which contains a mixture of, based on the total weight of the wax dispersion, 1. from 5 to 20% by weight of an aqueous secondary wax dispersion of from 5 to 40% by weight, based on the secondary wax dispersion, of an ethylene copolymer wax consisting of from 10 to 25, preferably from 15 to 24, % by weight of an α-olefinically unsaturated mono- or dicarboxylic acid of 3 to 8 carbon atoms and from 90 to 75, preferably from 85 to 76, % by weight of ethylene and having a melt flow index of from 1 to 600, preferably from 5 to 500, measured at 190° C. and under a load of 2.16 kp, or a melt flow index of from 1 to 600, measured at 160° C. and under a load of 325 g, from 0.1 to 5% by weight of an alkali metal hydroxide, ammonia, an alkanolamine or a dialkylalkanolamine or mixtures of these, if required from 1 to 5% by weight of a non-ionic or anionic emulsifier, and water to make up to 100%, 2. from 20 to 50% by weight of an aqueous primary dispersion having a solids content of from 20 to 70% by weight, 3. from 1 to 8% by weight of one or more plasticizers, 4. from 0.2 to 2% by weight of leveling agents and 5. from 73.8 to 20% by weight of water.

The surprising aspect of the invention is that copolymers containing a substantially larger amount of α-olefinically unsaturated carboxylic acids compared with the prior art and having a higher molecular weight, corresponding to a lower melt flow index, are substantially superior to the products described in, for example, German Laid-Open Application DOS No. 3,044,519 or German Published Application DAS No. 1,720,232. Although the novel products do not afford greater hardness, when used in the finished floor polish formulation they give outstanding results in the walk-on test, which not only surpass the ethylene/α-olefinically unsaturated carboxylic acid copolymers tested to date but are also superior to polyethylene oxidation products which have been among the best products in the floor polish sector over the past few years.

The present invention therefore furthermore relates to the use of ethylene copolymers, as defined under 1, as aqueous secondary wax dispersions for floor care, in particular for increasing the mechanical strength of the dry floor covering, together with conventional primary wax dispersions and additives.

The term primary dispersion is applied to the film-forming base emulsion of a self-shine floor emulsion. As a rule, a primary dispersion contains a copolymer which in itself is not a wax. This primary dispersion is mixed with special wax products, for example in the form of an aqueous dispersion, ie. a secondary dispersion, with the result that the mechanical properties of the floor covering are decisively improved. Examples of conventional secondary waxes which are frequently used are polyethylene oxidation products. One of the special features of the present invention is that, contrary to previous practice, the hard waxes used are not particularly hard.

The ethylene copolymers used according to the invention contain from 10 to 25, preferably from 15 to 24, % by weight of α-olefinically unsaturated mono- or dicarboxylic acids of 3 to 8 carbon atoms, examples of these being acrylic acid, methacrylic acid, crotonic acid, maleic acid, fumaric acid and itaconic acid. Acrylic acid and methacrylic acid, and mixtures of these, are particularly preferred.

According to the invention, the ethylene copolymer waxes have a specific MFI (melt flow index) or melt index. The MFI indicates the amount of polymer melt in grams which can be forced through a nozzle of particular dimensions at a particular temperature and using a specified force (load). The melt index (MFI units) is determined by the standard method ASTM D 1238-65 T, ISO R 1133-1696 (E) or DIN 53,735 (1970), which are identical. The MFI is a parameter which is used in the polymer sector in order to obtain information about the molecular weight. Since exact molecular weight determination is very expensive in certain circumstances, for the sake of simplicity the MFI is used in the case of polymers having similar chemical compositions. A high MFI indicates a relatively low molecular weight, while a low MFI points to a relatively high molecular weight. Whether the measurement is carried out at 190° C. or 160° C., as stated above, depends on the melt behavior in relation to the molecular weight. It should be pointed out that products which are measured at 190° C. and under 2.16 kp invariably have a higher molecular weight than those measured at 160° C. and under a load of 325 g.

The specific melt flow indices of the ethylene copolymer waxes used, which indices constitute an essential feature of the invention, are from 1 to 600, preferably from 5 to 500, very particularly preferably from 15 to 300, measured at 190° C. and under 2.16 kp, or from 1 to 600, measured at 160° C. and under 325 g. Waxes which have an appropriate MFI at 190° C. and under 2.16 kp need not necessarily also be within the range essential for the invention when the measurement is carried out at 160° C. and under 325 g, and vice versa. The fairly high molecular weight waxes measured at 190° C. are the particularly preferred waxes.

Another general characteristic of waxes is the Höppler hardness, which, for the novel ethylene copolymer waxes, is from 200 to 600, preferably from 300 to 500, bar, measured at 23° C. by the DGF standard method M III9a(57).

When the special ethylene copolymer waxes are used in floor emulsions, the surprising result is that, in spite of only moderate hardness, excellent properties are obtained in the walk-on test. It has been assumed to date in practice that only very hard waxes having a Höppler hardness of from 700 to 800 bar and higher can lead to an improvement in the walk-on test.

The acid numbers of the special waxes according to the invention are from 70 to 200, preferably from 120 to 170.

The novel secondary dispersion furthermore contains from 0.1 to 5, preferably from 1 to 3, % by weight of an alkali metal hydroxide, preferably potassium hydroxide or sodium hydroxide, ammonia, a mono-, di- or trialkanolamine, each having 2 to 18, preferably 2 to 6, carbon atoms in the hydroxyalkyl radical, a mixture of the stated alkanolamines, or a dialkylmonoalkanolamine where alkyl and hydroxyalkyl are each of 2 to 8 carbon atoms, or a mixture of these. Examples of amines are diethanolamine, triethanolamine, 2-amino-2-methylpropan1-ol and dimethylethanolamine.

As a rule, an alkali metal hydroxide, ammonia or an alkanolamine is used in an amount which is within the above range and is sufficient to neutralize no more than about ⅔ of the carboxyl groups.

Suitable non-ionic or anionic emulsifiers which may, if required, be used for the secondary dispersion are conventional emulsifiers, in particular oxoalcohol oxyethylates, oxyethylates of straight-chain or branched fatty alcohols or alkylphenol oxyethylates, preferably in amounts of from 1 to 3% by weight, based on the secondary dispersion.

The primary dispersion is the conventional filmforming primary dispersions for floor polishes.

These are, in particular, aqueous dispersions of waterinsoluble copolymers which may or may not be crosslinked with metal ions and which contain, as copolymerized monomer units, carboxyl-containing comonomers and carboxylfree monoethylenically unsaturated compounds which may carry one or more reactive groups capable of effecting covalent crosslinking of the copolymers, the dispersions containing not less than 20% of solids and having a pH of from 7 to 11, as described in, for example, European Patent No. 6547.

Examples of the carboxyl-free monomers are esters of acrylic acid or methacrylic acid with a saturated, monohydric aliphatic alcohol, in particular an alcohol of 1 to 4 carbon atoms, such as methanol, ethanol, n- or isopropanol, n-butanol, isobutanol, sec.-butanol or tert.-butanol.

The alkyl acrylates and methacrylates where alkyl is of 1 to 4 carbon atoms, and mixtures of these, are used in an amount of from 30 to 95% by weight, based on the copolymer. In addition to the acrylates and methacrylates, further suitable copolymers are acrylonitrile, vinyl acetate, styrene, vinyl chloride and vinylidene chloride, these being used in an amount of from 5 to 55, preferably from 30 to 50, % by weight, based on the copolymer. Among these, styrene, in an amount of from 5 to 20% by weight, is particularly preferred.

Carboxyl-containing copolymers, which are advantageously incorporated as copolymerized units in an amount of from 8 to 12% by weight, based on the copolymer, are acrylic acid and methacrylic acid. Another suitable component comprises from 0.5 to 2.5% by weight, based on solid copolymer, of N-methylolacrylamide or N-methylolmethacrylamide, both of which contain a group capable of effecting covalent crosslinking of the polymers. The stated copolymer is prepared by a conventional emulsion copolymerization method. If required, the finished dispersion may additionally contain a non-ionic dispersant.

Because of the presence of metal ions and of free carboxyl groups, the copolymers of this primary dispersion undergo ionic crosslinking. Metal ions which are added are, in particular, ions of berylium, magnesium, zinc, barium, strontium, aluminum, bismuth, antimony, cobalt, iron and nickel, as well as of other polyvalent metals. The ions are employed in the form of metal compounds, the latter advantageously being used in an amount of from 0.3 to 5, preferably from 0.4 to 3, % by weight, based on the copolymer.

Particularly suitable metal compounds are those which have a solubility of not less than 1% by weight in water, eg. hydroxides, oxides, basic, neutral or acid salts, such as acetates, or ammonia or amine complexes, in particular those of zinc or of calcium.

A particularly preferred primary dispersion which together with the wax used according to the invention, in the form of a secondary dispersion, gives advantageous results, contains a water-insoluble copolymer which is crosslinked with metal ions and consists of from 70 to 90% by weight of one or more alkyl acrylates or methacrylates where alkyl is of 1 to 4 carbon atoms, in particular methyl methacrylate, ethyl acrylate or butyl acrylate, from 5 to 20% by weight of styrene, from 8 to 12% by weight of acrylic acid or methacrylic acid or a mixture of these, from 0.5 to 2.5% by weight of N-methylolacrylamide or N-methylolmethacrylamide and from 0.4 to 3% by weight of metal ions, in particular zinc ions.

These primary dispersions have a solids content of, preferably, from 30 to 70% by weight. Their pH is from 7 to 11, preferably from 8 to 10, particularly as a result of the polymerization conditions and the addition of the metal. The pH can be adjusted as desired by adding, for example, ammonia. The resulting dispersions can be diluted as desired with water and brought to the concentration desired for the particular intended use.

If this primary dispersion is applied onto a substrate, it dries to give a glossy film; in addition to the ionic crosslinking, additional covalent crosslinking is also present, due to the comonomer units carrying reactive groups. This gives coatings which are very hard but sufficiently resilient and which are very resistant to solvents and water. They can be readily washed away again with, for example, ammonia-containing water (complex formation with metal). As is usual in practice, a primary dispersion of this type is further improved by introducing other additives which modify the properties of the resulting coatings, such an improvement being achieved by the secondary dispersion according to the invention.

Primary and secondary dispersions constitute concentrates, and their mixtures with other conventional additives in the ratios stated above constitute the total wax dispersion or total formulation for the consumer. Other suitable conventional components comprise from 1 to 8% by weight of one or more plasticizers, ie. permanent or temporary plasticizers, for example methyldiglycol or tributoxyethyl phosphate, and from 0.2 to 2% by weight of a leveling agent, for example a fluorine-containing leveling agent of the formula

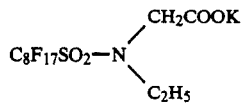

the percentages in each case being based on the total weight of the wax dispersion. Finally, from 73.8 to 20% by weight of water is added to the total wax dispersion so that, as a rule, the total formulation is brought to a solids content of from 15 to 50% by weight.

The ethylene copolymer waxes for the secondary dispersion are prepared in a conventional manner by continuous copolymerization of ethylene with the unsaturated carboxylic acids in the presence of free radical initiators. Polymerization takes place at from 150° to 300° C. and under from 1,000 to 3,000 bar in a single-phase polymerization medium, with ethylene conversions of not more than 25%. The ethylene is present in a supercritical state and acts as a solvent for the reaction mixture and the polymer melt. The $\alpha$-ethylenically unsaturated acids and the free radical polymerization initiator used are metered separately into the reaction mixture. The regulators required for adjusting the molecular weight can be metered in together with the comonomers or together with the free radical initiator.

The mixture contains not more than 5% by weight, based on the sum of the monomers, of regulators. The regulators used are conventional substances having this function. These include, for example, aliphatic aldehydes of 3 to 6 carbon atoms, such as propionaldehyde or n-butyraldehyde, aliphatic ketones of 3 to 6 carbon atoms, such as acetone or methyl ethyl ketone, $\alpha$-olefins of 3 to 6 carbon atoms, such as propene, but-1-ene or pent-1ene, or $C_3$–$C_5$-alkanes, such as propane, n-butane or n-pentane. Aliphatic aldehydes, such as propionaldehyde or n-butyraldehyde, are preferably used.

From 3 to 25% by weight of the ethylene is converted by a continuous procedure, and the resulting polymer is removed continuously from the reaction zone.

The polymerization takes place in a single-phase polymerization medium, the ethylene present in the supercritical state serving as a solvent for the reaction mixture and the polymer melt.

Expedient metering of acrylic acid, regulators and initiators must of course be ensured, since otherwise there are disadvantages such as too high a molecular weight and consequently poorer emulsifying properties, reduced hardness and hence less favorable film properties.

A secondary wax dispersion is prepared in a conventional manner in an emulsification autoclave, a temperature of about 150° C. and a pressure of about 5 bar being required. In general, a single-vessel process is employed, in which all components, such as wax copolymer, alkali metal hydroxide and/or amines and where relevant emulsifiers, and the water, are introduced into the autoclave and brought to the required pressure and temperature in a closed system with the stirrer running at a moderately high speed.

The secondary wax dispersion is mixed with a primary dispersion of appropriate composition and in accordance with the requirements which the floor polish has to meet, and temporary and permanent plasticizers and a fluorine-containing leveling agent are added. The remainder to 100% by weight consists of water.

The resulting ready-to-use floor polish emulsion is applied onto linoleum or hard PVC covering by means of a brush or sponge and, after it has dried in the air, is subjected to a walk-on test. Floors which are subjected to a great deal of use are suitable for this purpose. The coverings, 50 x 50 cm, are anchored to the floor by means of adhesive edges in such a way that they do not slip. After a three-week walk-on test, the coverings are removed and evaluated.

The Examples which follow illustrate the invention. Parts are by weight, unless stated otherwise.

I. Preparation of ethylene copolymer wax

EXAMPLE 1

A mixture of 349 kg/h of ethylene, 10.5 kg/h of acrylic acid and 0.5 kg/h of propionaldehyde was passed continuously, at 35° C., through a 10 l stirred autoclave maintained under 2,300 bar. The temperature in the autoclave reactor was kept at 216° C. by the continuous addition of 202 g of tert.-butylperpivalate per hour (as a rule, in a suitable solvent). When the reaction mixture was let down, the polymer was obtained in an amount of 49 kg/h, corresponding to a conversion of 16.9%, based on the ethylene throughput. It contained 17% by weight of acrylic acid and had a melt flow index MFI 190/2.16 of 220.

Examples 2 to 8 below were carried out as described in Example 1, differing preparation conditions and the product parameters being summarized in Tables 1a and 1b.

The copolymer waxes prepared in Experiments 1 to 8 were emulsified using non-ionic emulsifiers, such as alcohol oxyethylates or alkylphenol oxyethylates, in the presence of an alkali metal hydroxide solution, such as KOH or NaOH, to give highly transparent emulsions, the alkali metal hydroxide solution being used alone or together with ammonia or with amines, such as diethylethanolamine (DEE), dimethylethanolamine, triethanolamine or 2-amino-2-methylpropan-1-ol.

which could readily be recognized from the blue color of the product discharged.

When diluted 1:400, the resulting emulsion had transparency to light of 77%, measured in a 5 cm cell at 533 nm. The emulsion did not exhibit any creaming even after prolonged storage. Coatings on a glass plate formed speck-free, clear, glossy, very tough, scratch-resistant films at room temperature, as are desirable for the floor polish sector.

Examples 10 to 21 are summarized in Table II.

The emulsions 11-21 were prepared by a method essentially similar to the preparation method (10). In some cases, in contrast to the method described above, the stock emulsion method was employed. In this method, which is used in particular for waxes which are rather difficult to emulsify, emulsification is initially carried out using only from 30 to 60% by weight of the envisaged amount of water. The remaining amount of water is generally forced in only toward the end of the TABLE Ia

| Example No. | Pressure (bar) | T max. (°C.) | T mixture (°C.) | Ethylene throughout (kg/h) | Metering of AA (kg/h) | Metering of TBPPI (g/h) | Metering of PA (kg/h) | Amount discharged (kg/h) | Conversion (%) | AA content (% by weight) | MFI 190/2.16 (g/10′) | MFI 160/325 (g/10′)*** |
|---|---|---|---|---|---|---|---|---|---|---|---|---|
| 2 | 2300 | 212 | 35 | 350 | 13.5 | 289.1 | 0.42 | 48 | 17.5 | 21.5 | 125 | |
| 3 | 2300 | 218 | 39 | 346 | 15.7 | 358.5 | 0.21 | 50 | 18.2 | 23.9 | 32 | |
| 4 | 2300 | 216 | 39 | 342 | 17.9 | 216.0 | — | 47 | 17.3 | 20.6 | 3.5 | |
| 5 | 2300 | 210 | 35 | 340 | 10.6 | 109.7 | 0.26 | 46 | 16.2 | 16.9 | 16.5 | |
| 6 | 2300 | 219 | 26 | 342 | 10.3 | 167.2 | 2.07 | 56 | 19.6 | 16.5 | | 490 |
| 7 | 2300 | 218 | 45 | 341 | 6.2 | 70.6 | 0.91 | 50 | 16.3 | 10.0 | | 215 |
| 8 | 2300 | 220 | 25 | 350 | 14.4 | 215.3 | 2.11 | 58 | 21.1 | 21.5 | | 600 |
| 9* | 2300 | 220 | 35 | 288 | 1.8 | (12.7**) | 0.87 | 44.8 | 15.5 | 3.65 | | 280–300 |

AA = acrylic acid
PA = propionaldehyde
TBPPI = tert.-butyl perpivalate
*Comparative Example according to German Laid-Open Application DOS 3,044,519
**tert.-butyl perisononanoate
***g per 10 minutes TABLE Ib

| Product Example No. | MP. °C. | ICN* 5 h/140° C. | Hoppler hardness bar |
|---|---|---|---|
| 1 | 91–108 | 1–2 | 400 |
| 2 | 94–115 | 1–2 | 340 |
| 3 | 92–118 | 2 | 310 |
| 4 | 95–124 | 1–2 | 450 |
| 5 | 108–138 | 3 | 500 |
| 6 | 85–92 | ¾ | 480 |
| 7 | 102–108 | 4 | 520 |
| 8 | 78–92 | ¾ | 200 |

*Iodine color number determined according to DIN 6162

II. Preparation of a secondary dispersion

EXAMPLE 10

To emulsify the wax described in Example 1, 20% by weight of wax, 2.9% by weight of a non-ionic emulsifier ($C_{13}/C_{15}$-oxoalcohol with 8 EO (ethylene oxide) units or straight-chain or branched $C_9/C_{11}$-fatty alcohols with 7 EO units or an alkylphenol oxyethylate with 10 EO units), 1.4% by weight of potassium hydroxide and 74.4% by weight of water were stirred in a closed autoclave at from 150° to 160° C. under from 5 to 6 bar to give a homogeneous melt. In order to obtain a satisfactory speck-free, finely divided emulsion, this temperature was maintained for one hour. The wax emulsion was then cooled rapidly. An optimum method of discharging the emulsion, which was under pressure, was via an intensive cooler. After cooling to room temperature, a very finely divided emulsion was obtained, emulsification process.

For the preparation of novel floor polish emulsions for the end user, the wax emulsions described in Table II are preferably mixed with a primary dispersion based on acrylic acid/styrene/acrylate, as described in, for example, European Patent 6547. The mixture is applied onto linoleum or a PVC covering and is dried in the air, and the resulting thin, highly glossy and scratch-resistant film is subjected to the conventional walk-on test.

III. Example of the preparation of a primary dispersion

An emulsion consisting of 250 parts of water, 160 parts of methyl methacrylate, 80 parts of butyl acrylate, 80 parts of ethyl acrylate, 36 parts of styrene, 36 parts of methacrylic acid, 8 parts of N-methylolmethacrylamide, 0.2 part of dodecylmercaptan, 6 parts of Na dodecylsulfate and 70 parts of a 4% strength potassium peroxydisulfate solution was metered, in the course of 2 hours and at 95° C., into a stirred solution consisting of 260 parts of water and 0.4 part of potassium peroxydisulfate. A further 20 parts of peroxydisulfate solution of the above concentration were then added in the course of 1 hour at the same temperature, and stirring was continued for a further 2 hours at 85° C.. The mixture was cooled, after which 10.5 parts of zinc ions (=2.5%) in the form of an ammoniacal zinc acetate solution were added, and the pH was brought to 9 with ammonia.

IV. The general method below is intended to describe the preparation of novel floor polishes from a primary dispersion and a secondary dispersion, but is not intended to restrict the invention 30 parts of the novel secondary wax dispersion described in Examples 10 to 20, 25 parts of a primary dispersion according to Example III, 41 parts of water, 5 parts of methyldiglycol, 0.9 part of tributoxyethyl phosphate, 0.6 part of tributyl phosphate and 1 part of a fluorine-containing surfactant were mixed to give a homogeneous mixture.

V. Testing of performance characteristics

In the general method IV above, instead of using 30 parts of secondary dispersion, the latter is used in each case in an amount corresponding to 7.5 parts of wax (acrylic acid/ethylene wax or comparative wax) in pure form. If necessary, the amount of water to be added is adjusted in order to obtain the same solids content. This ensures that the total mixture always contains the same amount of wax with the same amount of primary dispersion.

The results are summarized in Table III.

The polish mixture is applied onto a standard PVC floor covering with a fine-haired brush. The emulsion forms a glossy, tough polish film at room temperature.

The scratch resistance, toughness and soilability of the film are tested by a practical walk-on test. To do this, 50×50 cm hard PVC sheets are coated with the polish emulsion, dried, and placed in a room where they can be walked on very frequently.

After being exposed for 3 weeks, the soilability, formation of heel marks and scratch resistance are assessed. The comparative secondary dispersion used (a dispersion based on a polyethylene oxidation product) is a commercial formulation based on a hard wax which has been used to date in the floor polish sector.

To characterize the film produced on the PVC substrate, the gloss is measured at an angle of 85°, and the static friction is measured using a cobbler's apparatus conventionally used in the floor polish sector. The characteristics in the walk-on test, the gloss and static friction of the film could not be related to one another directly. In contrast, there was a clearly recognizable relationship between the nature of the wax and the result of the walk-on test. (E denotes ethylene and AA denotes acrylic acid).

The most advantageous mixtures, which received the figure of merit 1 in the walk-on test, were those of Examples 26, 27 and 30; these consist of the wax from Example 2 with 21.5% by weight of AA (MFI at 190° C./2.16 kp = 125), the wax from Example 3 with 23.9% by weight of AA (MFI at 190° C./2.16 kp = 32), and the wax from Example 4 with 20.6% by weight of AA (MFI at 190° C./2.16 = 3.5).

Examples 22, 24 and 28 in the walk-on test received the figure of merit 2. These are waxes according to Example 1 (17% of AA; MFI at 190° C./2.16 kp = 220) and according to Example 4 (20.6% of AA; MFI at 190° C./2.16 kp = 3.5). Comparative Example 34 containing a polyethylene oxidation product and, for the composition investigated, the wax examples 1, 2, 4, 6 and 8, are rated with figure of merit 3 in the walk-on test.

The comparisons, a wax according to German LaidOpen Application DOS No. 3,044,519 and a commercial lowviscosity E-AA wax, for which it was impossible to determine an MFI under the stated conditions, received figures of merit 4 and 5.

The fact that ethylene/acrylic acid copolymer waxes having a high AA content and a high molecular weight (low MFI) can be used for the preparation of outstanding floor polish emulsions must be regarded as surprising and unforeseeable. These products are furthermore substantially superior to the polyethylene oxidation products having a high molecular weight, as is shown by the comparative example. The Table shows that the waxes with an MFI of from 5 to 500, measured at 190° C. and under 2.16 kp, are preferred.

TABLE II

| Secondary emulsions | | Emulsification | Assessment of the emulsion | | | |
|---|---|---|---|---|---|---|
| Emulsion Example No. | Wax Type No. Example | assistant Composition** of the emulsion | Consistency, Ford cup ∅ 4 mm, 20° C. | pH value | Fineness | Transparency |
| 10 | 1 | 20% of wax 1<br>2.9% of surfactant***<br>1.4% of KOH | 18 sec | 8.8 | speck-free, blue discharge | 77% |
| 11 | 1 | 20% of wax 1<br>1.1% of NaOH<br>1% of NH4OH | 20 sec | 10 | speck-free, clear solution | 83% |
| 12 | 1 | 15% of wax 1<br>1.3% of KOH | 12 sec | 9.3 | speck-free, clear solution | 80% |
| 13 | 2 | 15% of wax 2<br>1.4% of KOH | 20 sec | 9.1 | speck-free, blue discharge | 87% |
| 14 | 2 | 15% of wax 2<br>1.8% of KOH | 15 sec | 9 | speck-free, clear solution | 89% |
| 15 | 3 | 15% of wax 3<br>1.4% of KOH | 1 min 45 sec | 9 | speck-free, clear solution | 80% |
| 16 | 4 | 15% of wax 4<br>2.1% of surfactant***<br>1.1% of NaOH<br>0.28% of DEE | highly viscous for more than 3 min | 8.6 | speck-free, clear solution | 84% |
| 17 | 4 | 15% of wax 4<br>2.1% of surfactant***<br>1.1% of NaOH<br>0.28% of DEE | 1 min 24 sec. | 9.4 | containing some specks, somewhat denser | 63% |
| 18 | 4 | 15% of wax 4<br>1.3% of NaOH | 34 sec | 9.7 | many fine specks, denser | 44% |
| 19 | 6 | 10% of wax 6 | 14 sec | 12.6 | coarse specks, milky | 15% |

TABLE II-continued

| Secondary emulsions | | Emulsification | Assessment of the emulsion | | | |
|---|---|---|---|---|---|---|
| Emulsion Example No. | Wax Type No. Example | assistant Composition** of the emulsion | Consistency, Ford cup ⌀ 4 mm, 20° C. | pH value | Fineness | Transparency |
| 20 | 8 | 1.1% of NaOH 20% of wax 8 | 13 sec | 9.5 | fine specks, transparent | 73% |
| 21 | 9* | 1.8% of NaOH 27% of wax 9 5.6% of surfactant*** 0.32% of KOH 0.35% of DEE | 28 sec | 10.7 | fine specks, milky | 31% |

*low molecular weight poly-E-AA containing 3.6% of AA, prepared according to German Laid-Open Application DOS 3,044,519
**water to make up to 100% in each case
***surfactant = $C_{13}/C_{15}$ oxoalcohol containing 8 ethylene oxide units
DEE = diethylethanolamine
E = ethylene
AA = acrylic acid

TABLE III

| Example No. | Secondary emulsion Example | | Gloss measurement (measuring angle 85°) | Static friction using cobbler's apparatus | Assessment after 3-week walk-on test Figure of merit - comment |
|---|---|---|---|---|---|
| 22 | 10 | Primary dispersion according to Example 3 | 46 | 0.60 | 2 - slight soiling |
| 23 | 11 | Primary dispersion according to Example 3 | 65 | 0.55 | 3 - clearly detectable soiling |
| 24 | 12 | Primary dispersion according to Example 3 | 73 | 0.50 | 2 - slight soiling |
| 25 | 13 | Primary dispersion according to Example 3 | 51 | 0.55 | 3 - clear detectable soiling |
| 26 | 14 | Primary dispersion according to Example 3 | 71 | 0.60 | 1 - very slight soiling |
| 27 | 15 | Primary dispersion according to Example 3 | 43 | 0.80 | 1 - very slight soiling |
| 28 | 16 | Primary dispersion according to Example 3 | 56 | 0.60 | 2 - slight soiling |
| 29 | 17 | Primary dispersion according to Example 3 | 70 | 0.55 | 3 - clearly detectable soiling |
| 30 | 18 | Primary dispersion according to Example 3 | 71 | 0.52 | 1 - very slight soiling |
| 31 | 29 | Primary dispersion according to Example 3 | 48 | 0.55 | 3 - clearly detectable soiling |
| 32 | 20 | Primary dispersion according to Example 3 | 50 | 0.60 | 3 - clearly detectable soiling |
| 33 (comparison) | 21 | Primary dispersion according to Example 3 | 44 | 0.50 | 4 - fairly pronounced soiling |
| 34 | polyethylene oxidation product | Primary dispersion according to Example 3 | 70 | 0.75 | 3 - clearly detectable soiling |
| 35 | poly-E-AA containing 17% of AA 1,200 cst/120° C. | Primary dispersion according to Example 3 | 41 | 0.70 | 5 - very pronounced soiling |

We claim:

1. A wax dispersion for floor polishes, which contains a mixture of, based on the total weight of the wax dispersion, (a) from 5 to 20% by weight of an aqeuous secondary wax dispersion of from 5 to 40% by weight, based on the secondary wax dispersion, of an ethylene copolymer wax consisting of from 15 to 24% by weight of acrylic acid or methacrylic acid or mixture of these, and from 85 to 76% by weight of ethylene and having an MFI, measured at 190° C. and under 2.16 kp, of from 5 to 500, from 1 to 5% by weight, based on the secondary wax dispersion, of an alkali metal hydroxide, ammonia, an alkanolamine or a dialkylalkanolamine or a mixture of these, optionally with I to 5% by weight of a nonionic or anionic emulsifier, and water to make up to 100% by weight, based on the weight of the secondary wax dispersion, (b) from 20 to 50% by weight of a conventional aqueous film-forming primary dispersion for floor polishes, which has a solids content of from 20 to 70% by weight and consists of a water-insoluble copolymer of from 70 to 90% by weight of one or more alkyl acrylates or methacrylates, where alkyl comprises 1 to 4 carbon atoms, from 5 to 20% by weight of styrene, from 8 to 12% by weight of acrylic acid or methacrylic acid or a mixture of these, from 0.5 to 2.5% by weight of N-methylolacrylamide or N-methylolmethacrylamide, and from 0.4 to 3% by weight of zinc ions, (c) from 1 to 8% by weight of at least one plasticizer selected from the group consisting of methyldiglycol and tributoxyethyl phosphate, (d) from 0.2-2% by weight of a fluorine-containing surfactant as a leveling agent, and (e) from 73.8 to 20% by weight of water.

* * * * *

UNITED STATES PATENT AND TRADEMARK OFFICE
CERTIFICATE OF CORRECTION

PATENT NO. : 4,750,933

DATED : Jun. 14, 1988

INVENTOR(S) : Franz BRANDSTETTER, et al.

It is certified that error appears in the above-identified patent and that said Letters Patent is hereby corrected as shown below: On The Title Page:

The Title is incomplete. It should read as follows:

-- FLOOR POLISH EMULSIONS BASED ON ETHYLENE COPOLYMER WAXES --

Signed and Sealed this

Twenty-fifth Day of October, 1988

Attest:

DONALD J. QUIGG

*Attesting Officer*      *Commissioner of Patents and Trademarks*